United States Patent

[11] 3,543,829

| [72] | Inventors | Matthew Schultz<br>Box 241;<br>William L. Schultz, Box 485, Red Lake<br>Falls, Minnesota 0 |
|---|---|---|
| [21] | Appl. No. | 726,414 |
| [22] | Filed | May 3, 1968 |
| [45] | Patented | Dec. 1, 1970 |
| [32] | Priority | May 5, 1967 |
| [33] | | Great Britain |
| [31] | | No. 20910/67 |

[54] TIRE BEAD BREAKER AND REMOVAL DEVICE
23 Claims, 15 Drawing Figs.

[52] U.S. Cl. ................................................. 157/1.28
[51] Int. Cl. ..................................................... B06c 25/06
[50] Field of Search .......................................... 157/1.17,
1.2, 1.22, 1.24, 1.26, 1.33 (W.H.D.)

[56] References Cited
UNITED STATES PATENTS

| 2,034,819 | 3/1936 | Maulis | 157/1.22UX |
| 2,413,010 | 12/1946 | Teegarden | 157/1.17 |
| 2,778,414 | 1/1957 | Oglesby | 157/1.26X |
| 2,937,676 | 5/1960 | Smyser | 157/W.H.Digest |
| 3,029,862 | 4/1962 | Gambardella | 157/1.24 |

*Primary Examiner*—Granville Y. Custer, Jr.
*Attorney*—Jerry B. Cesak

ABSTRACT: A tire removal device having a horizontal mandrel upon which the wheel is mounted and held by a plurality of brakeshoe elements expanded outwardly against the rim of the wheel. The mandrel is then moved outwardly with the wheel against a stationary outer bead-breaking shoe and then inwardly against a stationary inner bead-breaking shoe. A tire-restricting shoe is then swung into position opposite the inner bead-breaking shoe and the mandrel moved further inwardly thus withdrawing the wheel from the tire.

INVENTOR
MATTHEW SCHULTZ
WILLIAM L. SCHULTZ
BY
ATTORNEY

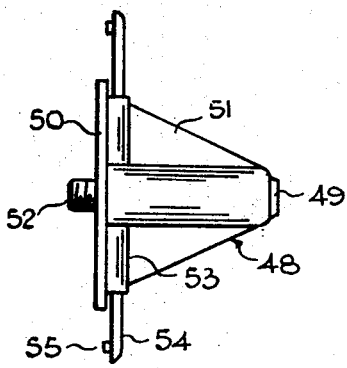
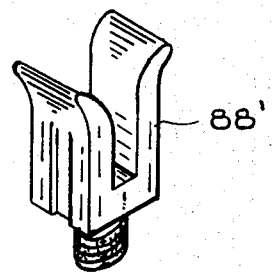
FIG-6  FIG-11
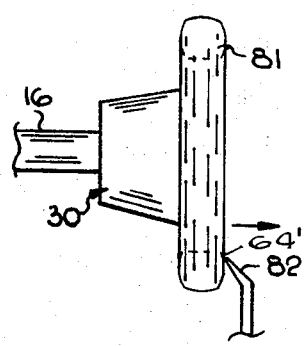 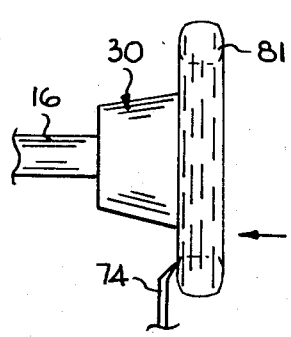 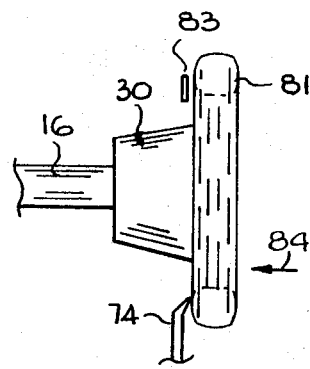
FIG-7  FIG-8  FIG-9
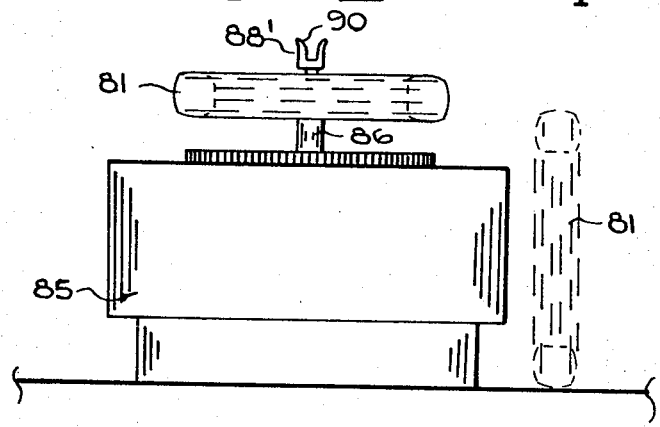
FIG-10

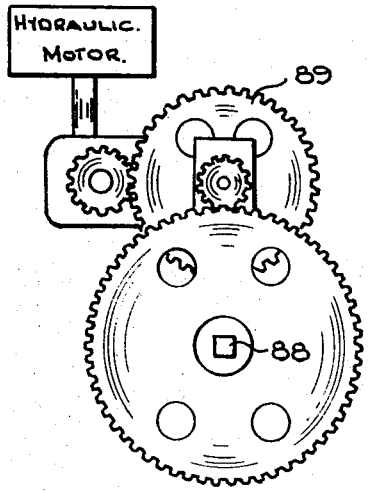
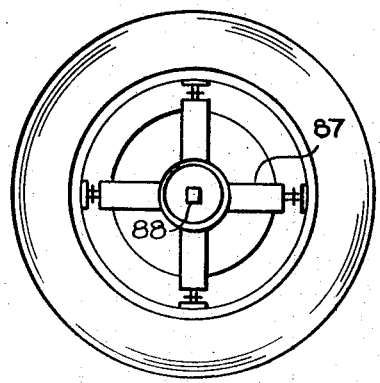
FIG-12　　FIG-13
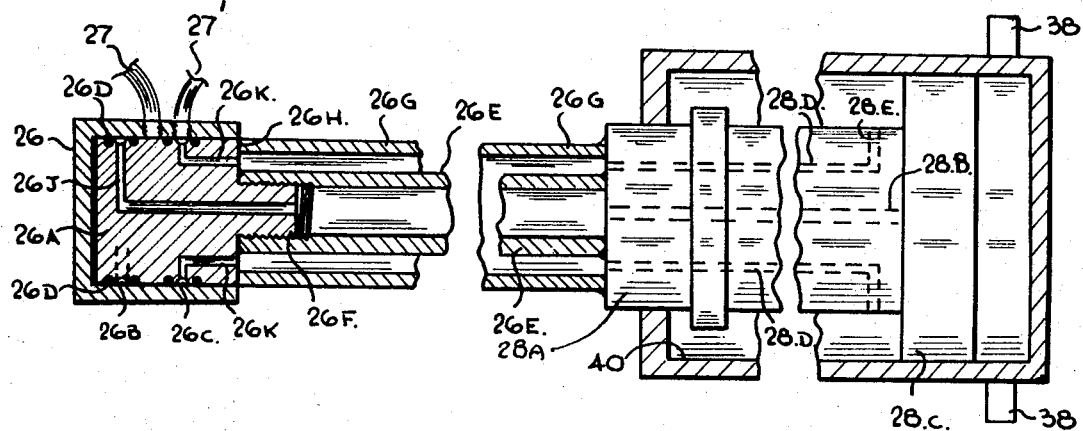
FIG-14

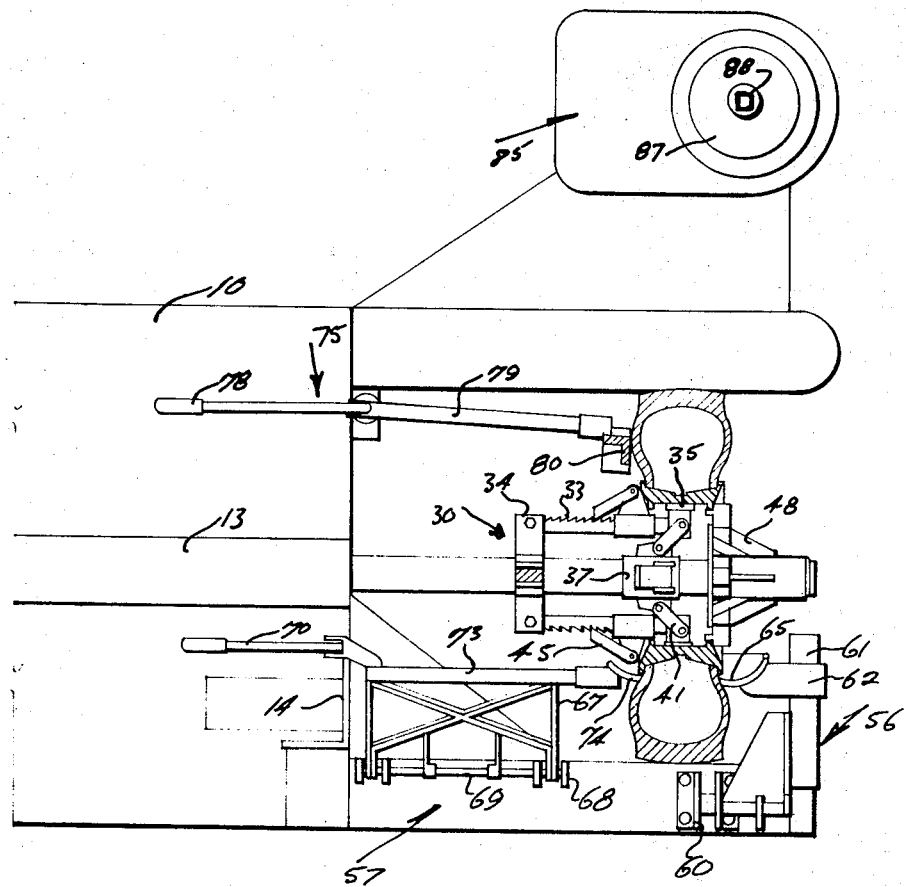
F'G 15

TIRE BEAD BREAKER AND REMOVAL DEVICE

This invention relates to new and useful improvements in tire bead-breaking devices and tire removal devices and it is specifically designed for use with heavy duty truck and tractor tires and the like.

The device can be used with tube-type tires which includes the conventional split rim construction and can also be used with tubeless tires.

The use of the device permits the tire to be mounted on the mandrel, one bead to be broken away so that the split rim can be removed, the other bead to be broken away and then the tire pushed from the rim which is held on the mandrel.

The foregoing actions are accomplished preferably by hydraulic power and require little, if any, effort by the operator.

The principal object and advantage of the present invention is to find a device of the character herewith described which enables heavy duty tires to be removed from the rims readily and easily including the normally difficult action of breaking the beads.

Another object of the invention is to provide a device of the character herewithin described which is adjustable within limits for use with different tires.

A still further object of the invention is to provide a device of the character herewithin described which includes an attachment enabling a tubeless tire to be removed after the beads have been broken by the main device.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying FIGS. in which:

FIG. 6 is a side elevation of the attaching spider.

FIG. 7 is a schematic view showing the step of breaking the outer bead.

FIG. 8 is a schematic view showing the step of breaking the inner bead.

FIG. 9 is a schematic view showing the step of removing the tire from the rim.

FIG. 10 is a side elevation of the device for removing tubeless tires from the rims thereof.

FIG. 11 is a fragmentary isometric view of the central fulcrum of FIG. 10.

FIG. 12 is a top plan view showing the drive mechanism for the device shown in FIG. 10.

FIG. 13 is a top plan view of the tire and wheel of FIG. 10 showing the holding spider in position.

FIG. 14 is an enlarged partially sectioned view of the wheel holding actuating mechanism.

FIG. 15 is a top plan view of the device with a tire installed and shown in section.

In the drawings like characters of reference indicate corresponding parts in the different FIGS.

Figure 1:
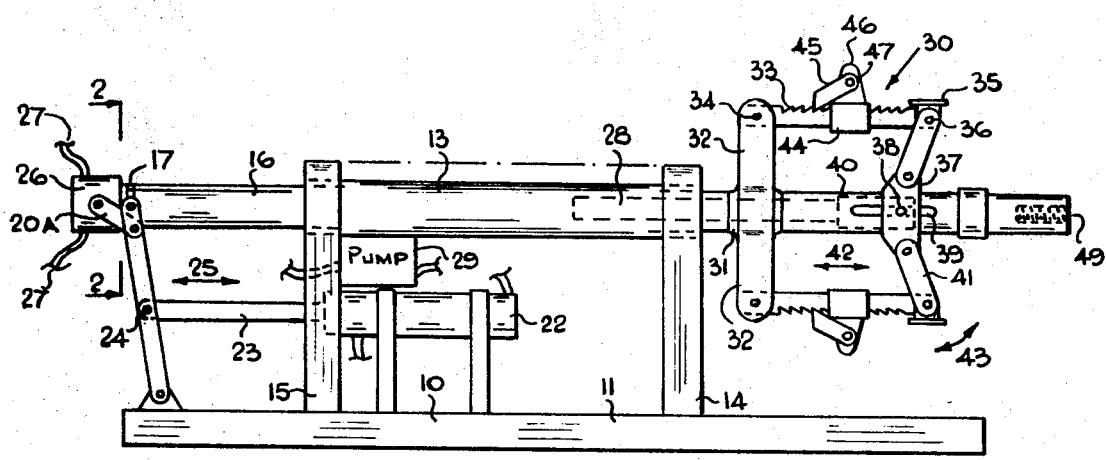
FIG. 1 is a side elevation of the device with the hydraulic connections deleted.

Proceeding therefore to describe the invention in detail, the device sits upon a substantially rectangular base frame 10 including longitudinal members 11 and cross members 12.

A heavy-duty bearing sleeve 13 is supported above the base 10 by means of triangular supports 14 and 15 and a mandrel 16 is supported within the bearing sleeve 13 for manual rotation and endwise movement.

At the rear end of the mandrel 16 is an annular groove 17 within which are engageable pins 18 carried within the arms 19 of a fork 20. This fork is pivoted on cross-shaft 21 to the base frame 10 and a hydraulic piston and cylinder assembly 22 has the piston rod 23 thereof pivotally connected as at 24 to the fork intermediate the ends thereof. Hydraulic fluid applied to either side of the piston within cylinder 22, causes the fork and hence the mandrel to be moved lengthwise within the sleeve bearing 13, in the direction of double-headed arrow 25.

A cover portion 26 covers the rear end of the mandrel 16 and hydraulic hoses 27 extend through the cover and to a pair of concentrically located tubes extending through the mandrel 16 to a piston and cylinder assembly 28 carried concentrically within the mandrel adjacent the forward end thereof.

The cover 26 is held to the arms 19 of the fork 20, by links 20A secured between the cover and the fork. A cylindrical block 26A is within the cover (see FIG. 14) and is provided with annular grooves 26B and 26C.

Sealing rings 26D on each side of each groove between the block 26A and the cover 26, isolate these annular grooves or passages so that hydraulic fluid from the relevant hose 27 or 27′ enters the respective grooves.

An inner pipe or tube 26E is screw-threadably secured concentrically to a shoulder 26F and extends within the mandrel to the rear end of piston 28A and connects to a central drilling or passageway 28B through the piston to exit rearwardly of the piston head 28C. Drillings 26J extend from groove 26B, through block 26A to shoulder 26F and thence to the interior of pipe 26E.

An outer pipe or tube 26G surrounds tube 26E concentrically and is secured to the end 26H of the block 26A. Drillings 26K extend from groove 26C, through the block to end 26H and connects to the annular space between the interior of pipe 26G and the exterior of pipe 26E.

This pipe 26G extends also to the rear of piston 28A and is secured thereto. Drillings 28D extend from this end to the side of the piston rearwardly of head 28C as at 28E. Therefore hydraulic fluid routed through tubes 26E or 26G controls the forward or rearward movement of the closed cylinder 40 surrounding the stationary piston 28A.

A hydraulic pump and motor assembly 29 are shown schematically in FIG. 1 and supply the hydraulic power required for operating the entire device.

A wheel-holding device collectively designated 30 is situated upon the front end of the mandrel in advance of the bearing sleeve 13. This wheel-holding device consists of a sleeve 31 secured to the mandrel and having a plurality of pairs of lugs or brackets 32 extending diametrically outwardly from the sleeve.

A ratchet arm 33 is pivotally connected by pin 34 to the ends of each of the pairs of lugs 32 and an arcuately curved brakeshoe assembly 35 is pin connected as at 36 to the distal end of each of the arms 33.

A movable sleeve 37 surrounds the mandrel in advance of sleeve 31 and a pair of pins 38 extend through longitudinal slots 39 in the wall of the mandrel and connect, by the inner ends thereof, with the cylinder 40 extending from the piston assembly 28 hereinbefore described. The outer ends of the pins 38 are connected to the sleeve 37.

A link arm 41 is pivotally connected to sleeve 37 and to each of the brakeshoe assemblies 35, pin 36 acting as a common fulcrum for the link arm and the ratchet arm 33.

It will therefore be appreciated that if the cylinder 40 is extended or retracted with respect to the piston 28, sleeve 37 will move within the limits of slot 39 and in the direction of double-headed arrow 42.

This will cause the brakeshoe assemblies 35 to move inwardly or outwardly in the direction of the double-headed arrow 43 so that if they are engaged within the rim of a wheel assembly, and are urged outwardly by hydraulic pressure, the arcuately curved brakeshoes 35 will grip the inner surface of the wheel hub thus holding the wheel and tire assembly firmly on the mandrel.

When mounting the wheel assembly upon the mandrel for removal of the tire, it is desirable to limit the rearward movement of the wheel assembly prior to expanding the brakeshoe assemblies 35 and in this connection we provide sliding blocks 44 on each of the ratchet arms 33 and being movable along the ratchet arms limited by the engagement of ratchet dog 45 within the ratchet teeth on the arms 33. The front surface 46 of the extending lugs 47 of the blocks 44 are engaged by the inner rim of the wheel as it is placed upon the brakeshoe assemblies 35.

It is sometimes desirable to ensure that the wheel assembly does not move during the bead-breaking operation and in this connection reference should be made to FIG. 6 which shows a spider assembly 48 which may be engaged within the end 49 of the mandrel after the wheel assembly has been placed upon the wheel-holding assembly 30.

The spider consists of a cylindrical portion 49 and a plate portion 50, webs 51 strengthening the relationship of the plate to the cylinder.

A screw-threaded bolt portion 52 extends from within the cylindrical portion 49 and engages within the end 49 of the mandrel which is correspondingly screw threadable.

A plurality of sockets or holders 53 are secured to the rear of the plate 50 and extend radially from the cylindrical portion 49 to adjacent the rim of the plate 50. Ratchet dogs 54 are slidable within these holders and include rim-engaging portions 55 on the ends thereof.

These are set so that the rim-engaging portions 55 engage the rim of the wheel assembly when the spider assembly is screwed onto the end 49 of the mandrel thus preventing any outward movement of the rim during the bead-breaking and tire removal operation.

Figures 4, 5:
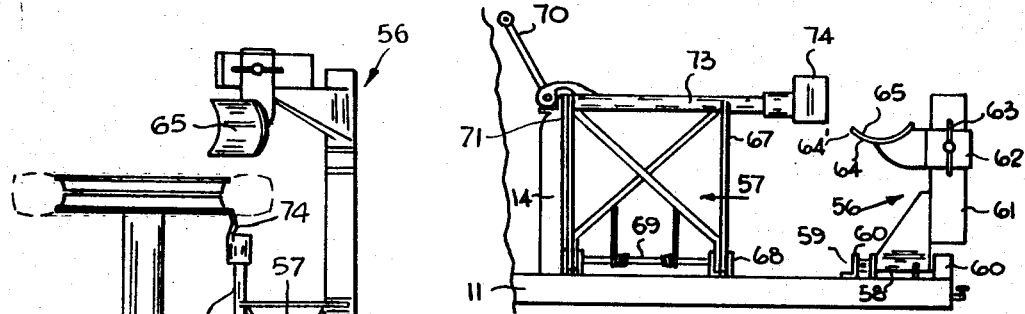
FIG. 4 is a fragmentary side elevation similar to FIG. 1 but showing the bead-breaking spades thereon.
FIG. 5 is substantially a top plan view of FIG. 4 but with a tire and wheel in place upon the mandrel.

Secured to one longitudinal member 11 is an outer bead-breaking component collectively designated 56 and an inner bead-breaking component collectively designated 57 (see FIG. 4).

The outer bead-breaking component comprises a bearing sleeve 58 mounted upon a shaft 59 carried within brackets 60. An arm 61 extends from the sleeve 58 and carries an adjustable bracket 62 slidable therealong and clamped by means of screw-threaded holding device 63.

Figures 2, 3:
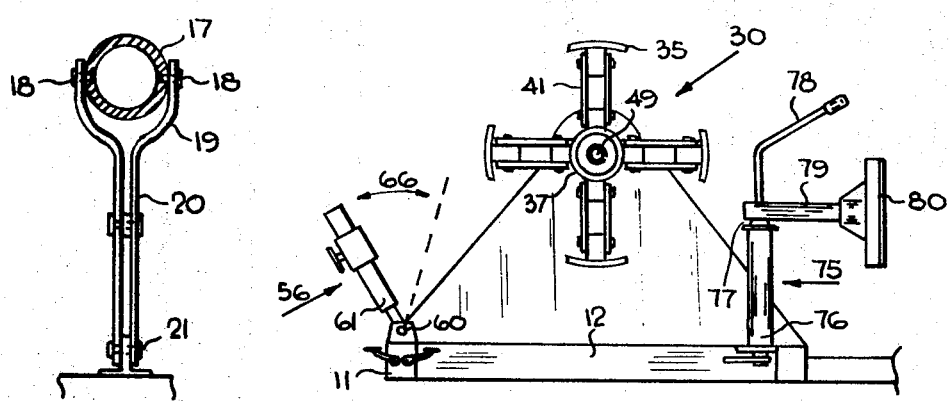
FIG. 2 is an end view along the line 2–2 of FIG. 1.
FIG. 3 is a front elevation of FIG. 1.

Extending from the sleeve 62 is a spadelike outer bead-breaking component 64 which is arcuately curved as at 65 to engage between the tire and the rim and to follow the contour of the tire adjacent the rim. Due to the sleeve 58 and shaft 59, this bead breaker can be swung out of position as shown in FIG. 3 or, into operating position, shown in FIG. 5, dotted line 66 showing the approximate arc of movement.

The component 57 comprises a rectangular frame 67 mounted within bracket 68 by means of pivot pin 69. This device 57 is situated adjacent the front support 14 of the bearing sleeve 13 and includes a locking lever 70 which includes a cam (not illustrated) which locks the device 57 against a plate 71, secured to front support 14, by friction means. An arcuately curved gage 72 is provided in this connection so that the device can be set to predetermined locations depending upon the wheel diameter. An arm 73 extends from the rectangular frame 67 and carries a similar spadelike bead breaker 74 which is also arcuately curved to follow the contour of the tire wall adjacent the rim of the wheel.

This component 57 can also be swung into and out of engagement with the wheel assembly as desired.

Situated upon the opposite longitudinal member 11 and substantially opposite the inner bead-breaking component 57 is a tire removal component collectively designated 75. A vertically situated tube 76 acts as a bearing for a spindle 77 movable through an arc by means of handle 78 extending upwardly therefrom.

An arm 79 extends from the spindle 77 and an arcuately curved tire wall engaging member 80 is secured to the end of the arm. The handle enables the portion 80 to be swung into and out of engagement as desired.

In operation, the mandrel 49 is partially extended by means of the hydraulic piston and cylinder assembly 22 whereupon the tire and wheel assembly collectively shown as 81, is engaged over the brakeshoe components 35 and against the faces 46 of the blocks 47. The piston and cylinder assembly 28 is now operated thus expanding the brakeshoe components against the interior of the tire rim thus locking the tire rim firmly on the mandrel.

The spider 48 may then be screwed into position in order to prevent any inadvertent movement of the rim relative to the mandrel.

The outer bead-breaking component 56 is now swung over into position so that the end 64' of the bead breaker 64 engages between the rim and tire as shown schematically in FIG. 7 at point 82. The mandrel together with the tire and rim is now extended further by means of the cylinder 22 thus forcing the bead breaker 64 between the rim and the tire and breaking the bead at this point. The mandrel is retracted slightly and the entire assembly manually rotated partially within the sleeve 13 whereupon the mandrel is again extended. This is repeated until the bead has been broken all the way around the wheel whereupon, if provided, the conventional split rim may now be removed from the wheel.

The outer component 56 is now moved to the outer position as shown in FIG. 3 and the inner bead-breaking component 57 is swung over and locked in position utilizing the gage 72 and the locking lever 70. The mandrel is now retracted by means of cylinder 22 thus breaking the junction of the tire and rim against the bead-breaking portion 74 of the inner component 57. This breaks the bead from the rim and once again this may be repeated several locations around the tire, it being understood that the entire mandrel and tire and rim assembly are rotated manually with the sleeve 13.

When the bead has been broken clear around the rim, the tire removal device 75 is swung into position so that the arcuately curved component 80 engages the tire wall adjacent the rim and as shown at 83 in FIG. 9. The mandrel is now retracted by the cylinder 22 and the bead-breaking component 74 together with the tire removal component 83, being diametrically opposite to one another, maintain the tire in the original position thus permitting the mandrel to draw the rim clear of the tire in the direction of arrow 84 (FIG. 9), the tire is thus pushed from the rim which may then be removed by releasing the brakeshoe components 35 and removing the spider 48.

If the tire is tubeless, the beads may be broken on both sides as hereinbefore described whereupon the device should be mounted upon the tubeless component collectively designated 85 and which may be secured to one side of the bead breaking machine and be operated from the same source of hydraulic power.

A shaft 86 is pivotal through 90° so that the tire and wheel can be mounted in the vertical position shown in FIG. 10 whereupon it may be swung through 90° so that the wheel is horizontal.

A clamping spider 87 is then placed in position to center the wheel and this spider engages the squared end 88 of the shaft 86. A fulcrum component 88' rests freely within the upper end of the spider.

Compound gearing 89 driven from an hydraulic motor (not illustrated) rotates shaft 86 together with wheel and rim assembly 81 held thereon, the fulcrum component 88 remains stationary.

Various tire removal devices may be fulcrumed within the open end 90 of the fulcrum block to remove or replace the tire from the rim.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

We claim:

1. A method of removing a tire from a wheel consisting of the steps of mounting the tire and wheel on a mandrel, breaking the outer bead by moving the mandrel together with the tire and wheel, against a stationary outer bead-breaking component, breaking the inner bead by moving the mandrel together with the tire and wheel in the opposite direction against a stationary inner bead-breaking component and then withdrawing the wheel from the tire by continuing the said movement of the wheel in the said opposite direction, with the inner bead-breaking component in position.

2. The method according to claim 1 which consists of the additional step of engaging a tire movement restraining component with said tire in a position substantially diametrically opposite to said inner bead-breaking component.

3. A bead-breaking and tire removal device operated by a source of hydraulic power and comprising in combination a supporting framework, a mandrel mounted in said framework for longitudinal horizontal movement within limits, hydraulic means in said framework operatively connected with said mandrel, for moving said mandrel as aforesaid, means mounting said mandrel in said framework for rotation around the longitudinal axis of said mandrel, wheel rim-engaging and holding means on said mandrel, hydraulic means to operate said engaging and holding means, an inner bead-breaking component on said framework, and an outer bead-breaking component on said framework.

4. The device according to claim 3 in which bead-breaking components are movable into and out of operating position.

5. The device according to claim 3 which includes a tire removal component on said framework but mounted on the opposite side thereof to said inner bead-breaking component.

6. The device according to claim 4 which includes a tire removal component on said framework but mounted on the opposite side thereof to said inner bead-breaking component.

7. The device according to claim 3 in which said wheel rim-engaging and holding means includes a plurality of brackets extending from said mandrel, arms extending from said brackets and being pivotally secured by one end thereof to said brackets, means on said arms to restrain movement of the wheel rim in one direction, a rim-engaging shoe on the other ends of said arms, and links extending between said other ends of said arms and said means to operate said holding means.

8. The device according to claim 4 in which said wheel rim-engaging and holding means includes a plurality of brackets extending from said mandrel, arms extending from said brackets and being pivotally secured by one end thereof to said brackets, means on said arms to restrain movement of the wheel rim in one direction, a rim-engaging shoe on the other ends of said arms, and links extending between said other ends of said arms and said means to operate said holding means.

9. The device according to claim 5 in which said wheel rim-engaging and holding means includes a plurality of brackets extending from said mandrel, arms extending from said brackets and being pivotally secured by one end thereof to said brackets, means on said arms to restrain movement of the wheel rim in one direction, a rim-engaging shoe on the other ends of said arms, and links extending between said other ends of said arms and said means to operate said holding means.

10. The device according to claim 6 in which said wheel rim-engaging and holding means includes a plurality of brackets extending from said mandrel, arms extending from said brackets and being pivotally secured by one end thereof to said brackets, means on said arms to restrain movement of the wheel rim in one direction, a rim-engaging shoe on the other ends of said arms, and links extending between said other ends of said arms and said means to operate said holding means.

11. The device according to claim 7 which includes further means detachably securable on the end of said mandrel to restrain the movement of said wheel rim in the opposite direction.

12. The device according to claim 8 which includes further means detachably securable on the end of said mandrel to restrain the movement of said wheel rim in the opposite direction.

13. The device according to claim 9 which includes further means detachably securable on the end of said mandrel to restrain the movement of said wheel rim in the opposite direction.

14. The device according to claim 10 which includes further means detachably securable on the end of said mandrel to restrain the movement of said wheel rim in the opposite direction.

15. The device according to claim 7 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

16. The device according to claim 8 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

17. The device according to claim 9 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

18. The device according to claim 10 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

19. The device according to claim 11 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

20. The device according to claim 12 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

21. The device according to claim 13 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

22. The device according to claim 14 in which said means to operate said holding means includes a sleeve slidable on said mandrel, said links being pivotally connected by one end thereof to said sleeve, hydraulic piston and cylinder means in said mandrel operatively connected to said sleeve to move said sleeve within limits, along said mandrel.

23. The device according to claim 3 which includes means to remove the associated tire from the associated wheel rim.